US008423456B2

(12) United States Patent
Egnatios et al.

(10) Patent No.: US 8,423,456 B2
(45) Date of Patent: *Apr. 16, 2013

(54) METHODS AND SYSTEMS FOR OPENING AND FUNDING A FINANCIAL ACCOUNT ONLINE

(75) Inventors: Rockne Egnatios, Scottsdale, AZ (US); Amy B. Byal, Mesa, AZ (US); Gerard Marineau, Redmond, WA (US); Robert L. Evans, Jr., Scottsdale, AZ (US)

(73) Assignee: Efunds Corporation, Scottsdale, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/416,785

(22) Filed: Mar. 9, 2012

(65) Prior Publication Data

US 2012/0173415 A1    Jul. 5, 2012

Related U.S. Application Data

(63) Continuation of application No. 11/796,561, filed on Apr. 27, 2007, now Pat. No. 8,160, 957.

(60) Provisional application No. 60/796,232, filed on Apr. 28, 2006, provisional application No. 60/816,820, filed on Jun. 27, 2006.

(51) Int. Cl.
*G06Q 40/00* (2012.01)
(52) U.S. Cl.
USPC .......................................................... 705/38
(58) Field of Classification Search ..................... 705/38
See application file for complete search history.

(56) References Cited

U.S. PATENT DOCUMENTS

| 6,993,505 | B1* | 1/2006 | Katz et al. ................... 705/38 |
| 7,587,363 | B2* | 9/2009 | Cataline et al. .............. 705/40 |
| 2002/0007343 | A1* | 1/2002 | Oyama et al. ................ 705/39 |
| 2003/0135457 | A1* | 7/2003 | Stewart et al. ............... 705/39 |
| 2004/0199462 | A1* | 10/2004 | Starrs ........................... 705/39 |

OTHER PUBLICATIONS

Veverka, Amber. The Charlotte Observer, N.C., Consumer Banking Column, Nov. 20, 2000.*
Huntley, Helen. St. Petersburg Times, Florida, on Money Column, Jul. 17, 2005.*
"Check Fraud Brings in Big Bucks." Bank Technology News, vol. 9, No. 10, p. 38+, Oct. 1996.*

* cited by examiner

*Primary Examiner* — Susanna M Meinecke Diaz
(74) *Attorney, Agent, or Firm* — Finnegan, Henderson, Farabow, Garrett & Dunner, LLP

(57) ABSTRACT

Methods and systems for opening an account with a financial institution. One method can include electronically storing at least one rule for opening an account with a financial institution. The method can also include electronically receiving account application information from a remote device over at least one network, wherein the account application information includes personal information of a customer requesting to open an account. In addition, the method can include generating at least one risk score based on the account application information and applying the at least one rule to the at least one risk score in order to determine a decision regarding the account application information and to determine at least one funding constraint associated with the account.

14 Claims, 6 Drawing Sheets

METHODS AND SYSTEMS FOR OPENING AND FUNDING A FINANCIAL ACCOUNT ONLINE

RELATED APPLICATIONS

This is a continuation of application Ser. No. 11/796,561, filed Apr. 27, 2007 now U.S. Pat. No. 8,160,957 which claims priority to U.S. Provisional Patent Application Ser. No. 60/796,232 filed on Apr. 28, 2006, and claims priority to U.S. Provisional Patent Application Ser. No. 60/816,820 filed on Jun. 27, 2006, the entire content of each of which is incorporated herein by reference.

BACKGROUND OF THE INVENTION

In the usual course of opening a financial account, and particularly a demand deposit account, a consumer physically visits a bank, savings and loan, or credit union (i.e., a financial institution) of choice and provides account application information (e.g., personal information) that meets the financial institution's requirements for risk assessment and identity verification (e.g., name; address; social security number; an identification card, such as a driver's license; etc.). The consumer also provides funds to be used in opening the account. The consumer is then presented with and chooses between various account options. The account is then "opened" using the consumer's account application information, funds presented by the customer are placed in the account, and the consumer signs a signature card to be used to confirm later transactions.

With the growing use of the Internet and online services, such as online banking services, customers desire mechanisms and services for opening and funding a new account remotely in order to avoid having to physically visit a financial institution. In response, financial institutions have created a number of online account opening services. Using an online account opening service, a customer can provide account application information and can provide account information of an existing account (e.g., a checking account) that is to be used as a funding source for the new account. Since the customer is physically remote from the financial institution and cannot provide physical account verification or authorization (e.g., a paper check, a credit or debit card, or other paper documents), the financial institution must attempt to verify the customer and/or the funding source.

In many existing online account opening services, verifying the funding source of the customer can be intrusive and time-consuming. For example, in order to verify a funding source, a customer may be required to provide a username and a password or other security mechanisms for the funding source that can be used to access the funding source remotely (e.g., online). The financial institution associated with the online account opening service uses the supplied username and password to attempt to remotely access the funding source. If the financial institution can access the funding source, the financial institution can verify that the customer owns the funding source. Many customers, however, may be unwilling to provide access information for a funding source to a third-party. In addition, many customers may not have remotely-accessible funding sources.

Another method of verifying a funding source for a new account opened through an online account opening service involves making a small or micro payment of a random amount to a funding source of the customer. If the customer can verify the amount of money deposited in the funding source, the financial institution can verify that the customer owns the funding source. The process of making a micro payment to a funding source, however, can take several days to complete, and does not allow the customer to apply and open a new account within a single online session.

SUMMARY OF THE INVENTION

Embodiments of the invention provide methods and systems for opening an account with a financial institution. One method can include electronically storing at least one rule for opening an account with a financial institution. The method can also include electronically receiving account application information from a remote device over at least one network, wherein the account application information includes personal information of a customer requesting to open an account. In addition, the method can include generating at least one risk score based on the account application information and applying the at least one rule to the at least one risk score in order to determine a decision regarding the account application information and to determine at least one funding constraint associated with the account.

Additional embodiments provide an account management system for opening an account with a financial institution. The account management system can include a memory module that stores at least one rule for opening an account with a financial institution and a rules engine application. The system can also include a processor and an input/output interface that receives account application information from at least one remote device over at least one network. The processor generates at least one risk score based on the account application information, the at least one risk score specifying a risk to the financial institution of opening the account for the customer and executes the rules engine application to apply the at least one rule to the at least one risk score in order to determine a decision regarding the account application information and to determine at least one funding constraint associated with the account.

Further embodiments provide a system for opening an account with a financial institution. The system can include an account management system, at least one network, and at least one remote device. The at least one remote device electronically transmits account application information to the account management system over the at least one network. The account management system generates at least one risk score based on the account application information, applies the at least one rule to the at least one risk score in order to determine a decision regarding the account application information and to determine at least one funding constraint associated with the account, and electronically transmits the decision and the at least one funding constraint to the at least one remote device over the at least one network.

DETAILED DESCRIPTION

Figure 1:
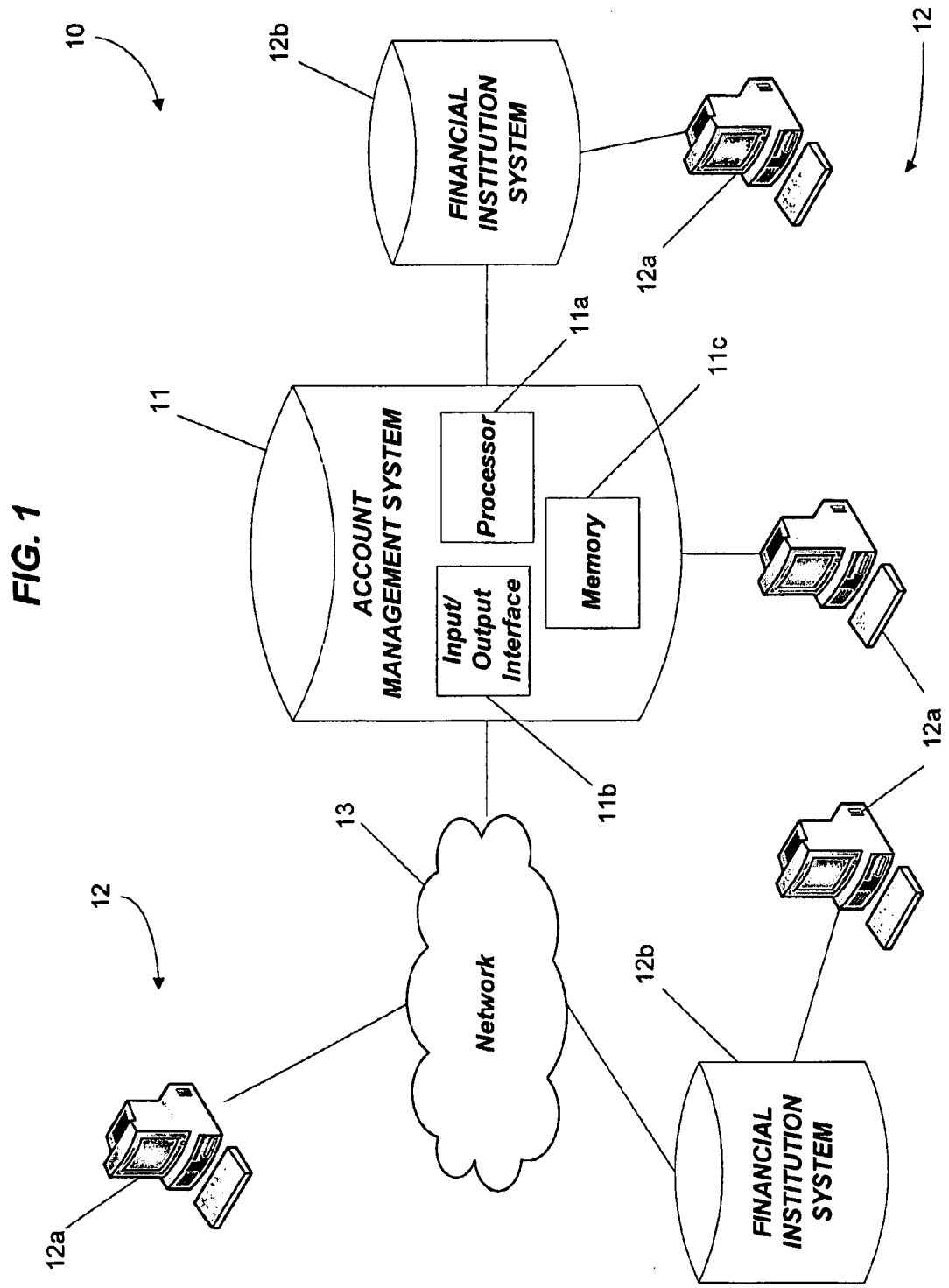
FIG. 1 illustrates a system for opening an account according to an embodiment of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limited. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and can include electrical connections or couplings, whether direct or indirect. Also, electronic communications and notifications may be performed using any known means including direct connections, wireless connections, etc.

It should also be noted that a plurality of hardware and software based devices, as well as a plurality of different structural components, may be utilized to implement the invention. Furthermore, and as described in subsequent paragraphs, the specific configurations illustrated in the drawings are intended to exemplify embodiments of the invention and that other alternative configurations are possible.

FIG. 1 illustrates a system 10 for opening an account with a financial institution according to an embodiment of the invention. As shown in FIG. 1, the system 10 includes an account management system 11 and one or more remote devices 12. The remote devices 12 can include but are not limited to a client computer 12a and a financial institution system 12b. It should be understood that the client computer 12a can include various devices, such as personal digital assistants ("PDAs"), Blackberry devices, cellular phones, and any other type device configured to output or transmit data to an external device. In some embodiments, the client computer 12a includes a general purpose computing device.

As shown in FIG. 1, the remote devices 12 can be connected to the account management system 11 via one or more networks 13. The networks 13 can include a local area network ("LAN"), a wide area network ("WAN"), a cellular network, the Internet, and/or other types of networks. Alternatively or in addition, the remote devices 12 can be directly connected to the account management system 11.

The account management system 11 can include an input/output interface 11a, one or more processors 11b, and one or more memory modules 11c. The input/output interface 11a can be configured to receive information from the remote devices 12 and can be configured to transmit information to the remote devices 12 (e.g., over the network 13). The input/output interface 11a can be configured to store information received from the remote devices 12 to the memory module 12c.

The memory module 12c can also store one or more software modules and/or applications and data that the processor 12a can fetch and execute in order to perform account opening services and/or other account management services. For example, as described below with respect to FIG. 4, the memory module 12c can store a rules engine application and rules applied by the rules engine application, an automated configuration application, and a management console application. The memory module 12c can also store output generated by the processor 12a and/or other data used by the applications stored in the memory module 12c.

It should be understood that the systems and devices illustrated in FIG. 1 can be combined and distributed in various configurations. For example, the account management system 11 can be combined with a financial institution system 12b and provided as a single system (e.g., provided by a single server). The account management system 11 can also be distributed among a plurality of systems or devices (e.g., provided by a plurality of servers).

Figure 2:
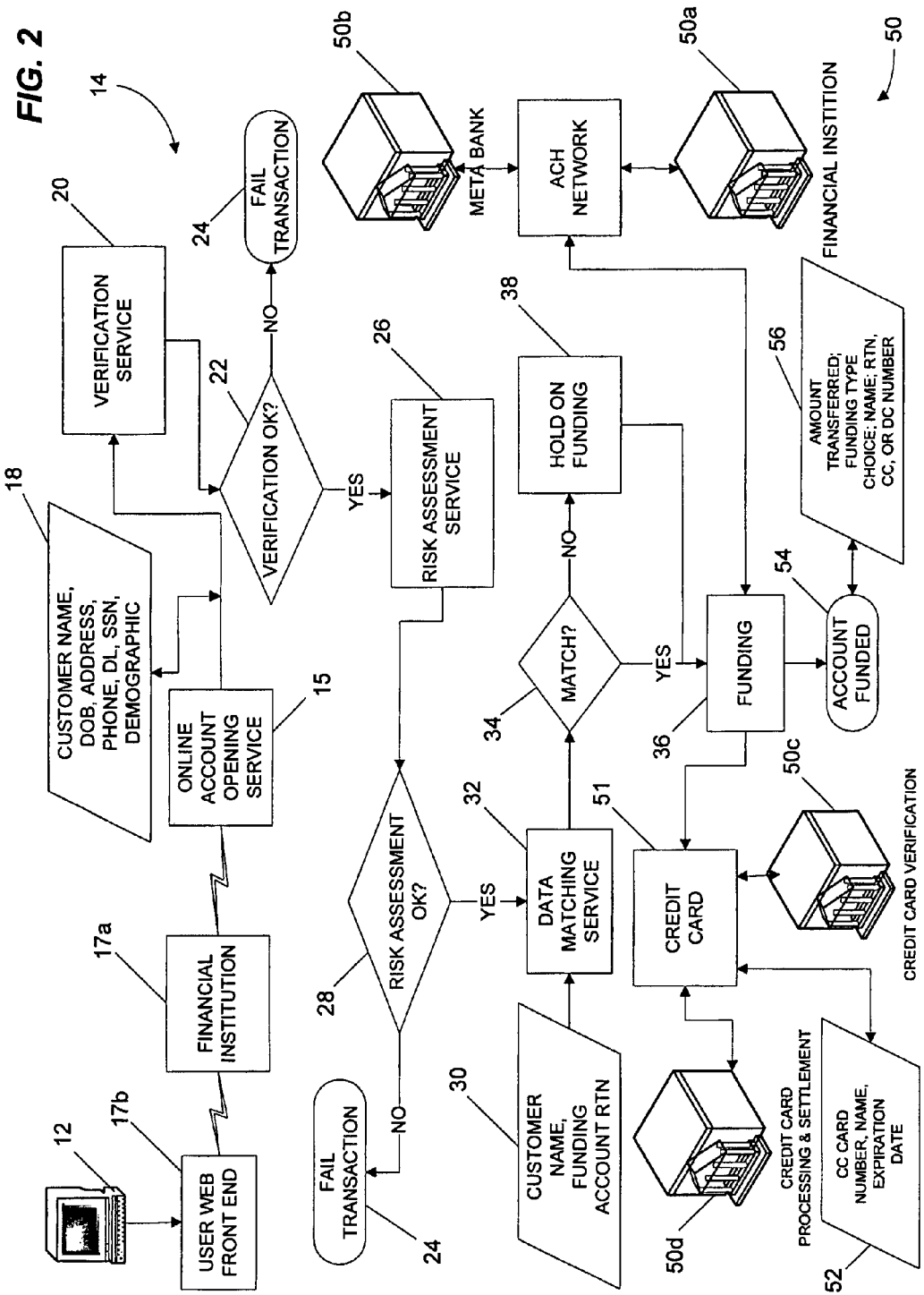
FIG. 2 illustrates a method of opening an account using the system of FIG. 1 according to an embodiment of the invention.

FIG. 2 illustrates a method 14 of opening an account using the system 10 according to an embodiment of the invention. In particular, the method 14 illustrates a method of verifying and opening a new account for a customer through an online account opening service of a financial institution [e.g., provided or hosted (e.g., ASP hosted) by the account management system 11]. It should be understood, however, that the account opening and funding method 14 can also be used to open new accounts when a customer physically visits or contacts (e.g., via a telephone) a location of a financial institution (e.g., a branch or a call center). For example, an agent or employee associated with the financial institution may use the online account opening service to determine whether to approve or reject an application for a new account presented by a customer physically visiting or contacting a location of the financial institution. A customer may also use the online account opening service to initiate a new account application and may visit a branch of a financial institution or call a call center of a financial institution in order to complete the application.

As shown in FIG. 2, to open a new account (e.g., a savings account, a demand deposit account, a checking account, a checking fixed term certificate account, a money market account, a youth account, a variable term certificate account, etc.) a customer can access an online account opening service 15 (hereinafter referred to as the "service") provided by the account management system 11 using a remote device 12, such as a client computer 12a connected to a network (e.g., the Internet). In some embodiments, the online account opening service 15 can also be used to open, fund, and/or manage other types of products, such as credit cards, overdraft lines of credit, home equity lines of credit, automobile loans, etc., in a similar manner as opening a new account. A financial institution associated with the online account opening service 15 can limit the types and number of accounts and products that can be opened and/or managed using the online account opening service 15.

In some embodiments, the remote device 12 executes a browser application to request, access, view, and provide input to screens (e.g., web pages) of the online account opening service 15. The remote device 12 can be located at the location of the customer applying for a new account (e.g., at a customer's home), at a physical location of a branch of a financial institution, or at a call center of a financial institution. If the remote device 12 is located at a call center of a financial institution, a customer service representative may operate the remote device 12 on behalf of a customer who calls in a new account request. In some embodiments, the online account opening service 15 tracks and manages customers or users connected to the service 15 (e.g., through the Internet or through an integrated system of a financial institution). For example, the service 15 can limit how many times a user connected from a particular network or system can be connected to the service 15 (e.g., within a predetermined amount of time, at one time, etc.).

In some embodiments, as shown in FIG. 2, the customer accesses the service 15 through a web site or web pages 17*a* provided by a financial institution. For example, in some embodiments, an "Open an Account" button on a web site of a financial institution links customers to the web site or web pages 17*b* of the online account opening service 15. Linking the service 15 to other web sites and pages 17*a* of a financial institution can leverage and complement the financial institution's existing online branding and can provide the financial institution's customers with a seamless experience when opening a new account online. In some embodiments, customers of the financial institution can use the online account opening service 15 to open and fund new accounts 24 hours a day and 7 days a week.

Figure 3:
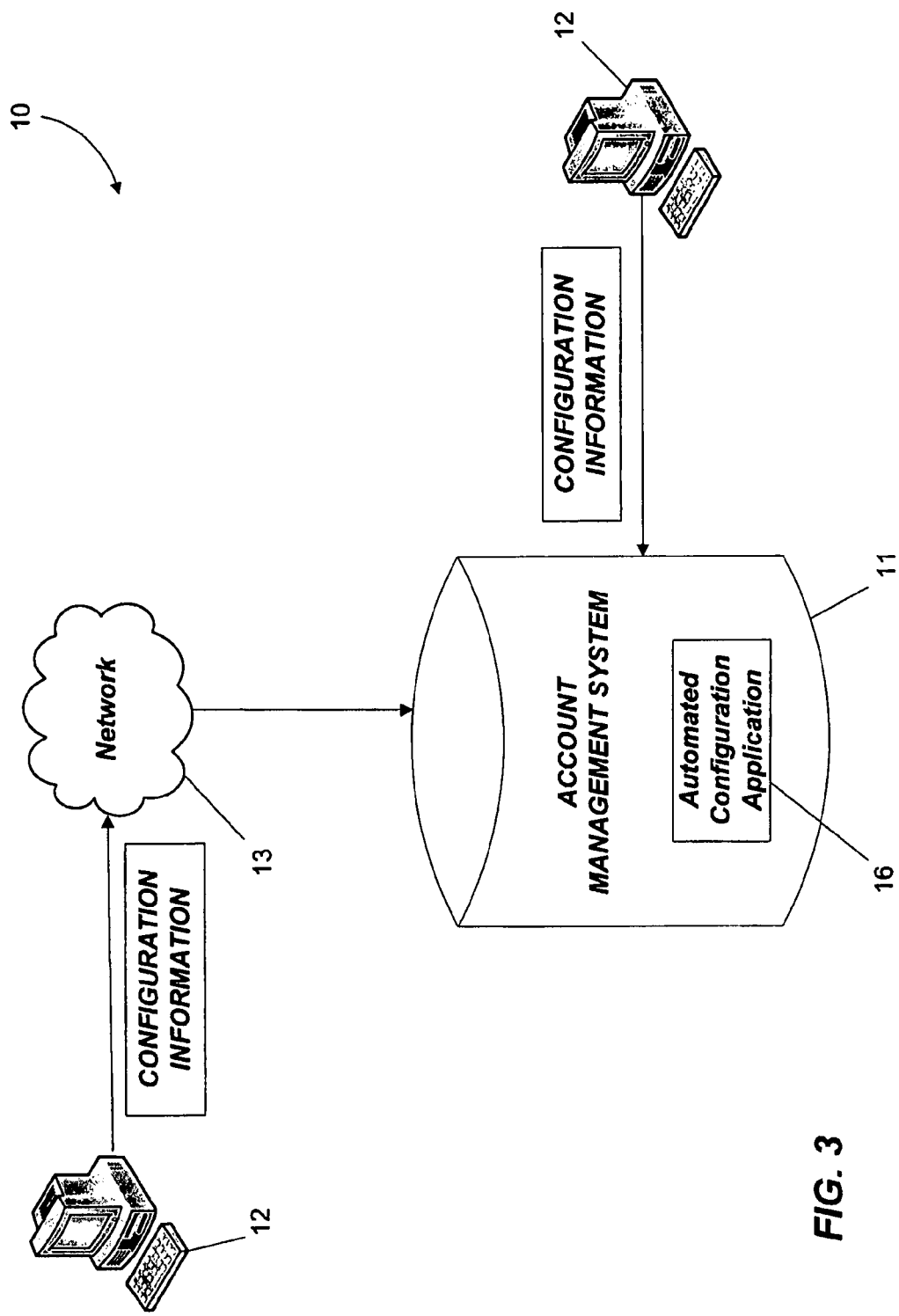
FIG. 3 illustrates a system for configuring the system of FIG. 1 according to an embodiment of the invention.

The screens (e.g., web pages 17*b*) of the online account opening service 15 can also be customized and/or branded based on the financial institution managing or operating the service 15. For example, screens 17*b* of the service 15 can be branded with the financial institution's logo, standards, and/or with a format consistent with other web pages of the financial institution. In some embodiments, a financial institution configures the screens and/or functionality of the online account opening service 15 using an automated configuration application 16 (e.g., a web-based configuration wizard) (see FIG. 3). As shown in FIG. 3, the automated configuration application 16 can be stored and executed (e.g., ASP hosted) by the account management system 11. Alternatively or in addition, the automated configuration application 16 can be locally stored on a device of a financial institution or a remote device and can transmit or download configuration information to the account management system 11.

As shown in FIG. 3, a user (e.g., an individual associated with a financial institution) can use a remote device 12, such as a computer, to access the application 16. In some embodiments, the remote device 12 executes a browser application to request, access, view, and provide input to screens (e.g., web pages) of the automated configuration application 16. Using the screens of the application 16, the user can provide configuration information, which can be transmitted to the account management system 11 (e.g., directly or via one or more networks 13). The account management system 11 can then process the configuration information in order to modify the functionality of the service 15. In some embodiments, the account management system 11 stores the configuration information (e.g., in the memory module 11*c*) and automatically applies the configuration information the next time a request for a new account for the financial institution is submitted. For example, after receiving configuration information from a particular financial institution via the automated configuration application 16, the account management system 11 can erase or override existing configuration information associated with the financial institution and can store the new configuration information.

The automated configuration application 16 can provide a financial institution with an easy (e.g., online) process that aligns the accounts, products, options, pricing, policies, rules, etc. offered by the financial institution through the service 15 with the financial institution's existing policies and procedures. Using the automated configuration application 16, a financial institution 16 can self-direct the look, feel, and functionality of the service 15 without having to physically contact the creator or provider of the service 15 in order to have the service 15 rewritten or redesigned. The automated configuration application 16 can walk a user through available configurations and can allow a financial institution to configure and change the look, feel, and functionality of the online account opening service 15 as needed in an automated fashion with minimal effort and time. In some embodiments, financial institutions can also customize the online account opening service 15 by providing unique content within screens of the service 15 and/or by adding additional screens not part of the standard process flow provided by the service 15.

The service 15 can provide a series of screens (e.g., web pages 17*b*) that automate an account opening and funding process for customers. In some embodiments, customer presentation screens of the online account opening service 15 are driven by a customer's input and selections in previous screens plus business rules and policies provided by a financial institution (e.g., via the automated configuration application 16). By customizing the screens, the online account opening service 15 can ensure that customers are presented with only the necessary process steps for completing an application for particular products selected by the customer.

The online account opening service 15 can also save and resume a new account application prior to its completion at any point during the application process. By allowing a customer to save a new account application, a customer or a customer service representative can review, revise, or reconstitute an application prior to its completion.

In addition, the online account opening service 15 can provide additional services. For example, the service 15 can display product information and options and associated selection tools, can provide electronic signature tools, can provide email confirmation services, can provide instant access to a newly funded account, and/or can provide online banking services.

Returning to FIG. 2, once the customer accesses the online account opening service 15, the customer can provide account application (e.g., personal) information 18 (e.g., a name, an address, a date of birth, a phone number, a social security number, a demographic, a driver's license number, etc.) via one or more screens of the service 15 (e.g., web pages 17*b* of the service 15). It should be understood that customers accessing the online account opening service 15 can include existing customers of a financial institution and new customers applying for a first account with a financial institution. In some embodiments, information associated with existing customers accessing the service 15 is automatically obtained by the service 15 through an accessible system of the financial institution (e.g., a core system of the financial institution). If personal information for an existing customer can be accessed from a system of the financial institution by the online account opening service 15, the service 15 may not prompt the customer to provide some or any account application information 18 or may only prompt the existing customer to provide any updated personal information (e.g., adding shares, updating name or addresses). Alternatively, if a customer is a new customer of the financial institution, the service 15 may prompt the customer for additional account application information 18, such as primary owner information, secondary owner information, additional owner(s) information, physical address information (e.g., cannot include P.O. Box), mailing address information (e.g., can include P.O. Box), international addresses information, standard premium information, etc.

Using the account application information 18, the online account opening service 15 can attempt to authenticate and verify the customer (e.g., in order to prevent identity theft). For example, the online account opening service 15 can verify an identity of a customer using a verification service 20. One commercially operational example of a network embodying a customer verification service 20 is the ID Verification™ brand network and service operated and offered by Penley. The verification service 20 can include a web-based anti-money laundering tool, which helps financial institutions meet compliance burdens (e.g., USA PATRIOT 326, 314(a), OFAC, etc.), and an identity fraud prevention program. For example, the verification service 20 can verify the identity of individuals and businesses by cross-checking aggregated records (e.g., billions of aggregated records) from multiple independent sources. In some embodiments, the verification service 20 provides substantially real-time results and provides a "pass" or "fail" answer and/or an intermediate verification score. The verification service 20 can also provide options for adding "out of wallet" or preset question/answer sets that must be answered by the customer in order to verify the customer's identity.

As shown in FIG. 2, if the customer does not pass the verification process performed by the verification service 20 (step 22), the online account opening service 15 can terminate or fail the new account process or transaction (step 24). If the customer passes the verification process (step 22), the online account opening service 15 can identify a financial risk associated with the customer (e.g., the likelihood that the customer is attempting a fraudulent account opening). For example, the online account opening service 15 can use a risk assessment service 26 to determine a risk (e.g., a risk score) associated with the customer. One commercially operational example of a network embodying a risk assessment service 26 is the Qualifile™ brand network and service operated and offered by eFunds Corporation of Phoenix, Ariz. (embodiments of which are described in co-pending U.S. application Ser. Nos. 09/653,595; 10/136,042; and 10/221,011; the entire contents of which are all herein incorporated by reference). The risk assessment service 26 can access financial data, such as debit bureau information, credit bureau data, demographic data, etc., from one or more sources (e.g., tri-bureau credit models) to predict or determine a risk associated with a customer. In some embodiments, the risk assessment service 26 uses one or more identity theft tools, such as a fraud identification system including a neural-network decisioning model, to predict the likelihood of identity manipulation or fraud. The identity theft tools can use customer data to provide a score on a customer that indicates a fraud risk level involved with doing business with the customer. In some embodiments, the identity theft tools also provide identity manipulation and predictive fraud modeling, which can identify inconsistent, inaccurate, or fraudulent information provided by a customer. In addition, in some embodiments, the identity theft tools provide fraud attributes on a real-time basis. An example of such a fraud identification service 26 is the FRAUDFINDER™ brand fraud identification system from ChexSystems, Inc., a wholly-owned subsidiary of eFunds Corporation.

The risk assessment service 26 can be used to accommodate consumer authentication. The risk assessment service 26 can use a logistic-regression model to predict the likelihood of account-related abuse. For example, the risk assessment service 26 can use customer data to calculate a risk that an account will be closed for abuse at a later date and can deliver a recommendation to a financial institution regarding an action to take on a new account application. Potential recommendations include approval of a new account and rejection of the new account. In some embodiments, the risk assessment service 26 also calculates cross-selling opportunities for additional products for a consumer. For example, based on a credit score and key demographic variables determined by the risk assessment service 26, the risk assessment service 26 can recommend which other products, if any, a financial institution should offer a customer. In some embodiments, the online account opening service 15 forwards cross-selling opportunities determined by the risk assessment service 26 to the customer for consideration (e.g., via one or more screen of the service 15). In some embodiments, a financial institution associated with the online account opening service 15 can also set parameters (e.g., via the automated configuration application 16) that allow risk assessment alignment with or customization from other risk assessment application channels.

As shown in FIG. 2, if a customer does not pass the risk assessment process performed by the risk assessment service 26 (step 28), the online account opening service 15 can terminate or fail the new account transaction (step 24). If a customer passes the risk assessment process (step 28), in some embodiments, the service 15 obtains funding source information 30 from the customer that identifies an existing founding source from which funds can be transferred to a new account. The funding source information 30 can include a customer name, a funding account routing transit number ("RTN"), etc. It should be understood that the customer can manually input funding source information 30 (e.g., via a screen of the service 15) and/or can use a card reader or other data accessing device to input funding source information. For example, the customer can use a card reader connected to the remote device 12 to swipe a credit card or debit card or can use a MICR check reader connected to the remote device 12 to scan a paper check. It should also be understood that, in some embodiments, the customer provides the funding source information 30 with or at the same time as the account application information 18.

In some embodiments, the online account opening service 15 provides several funding options. Therefore, the funding source information 30 can specify a credit card or debit card account, an ACH transfer, an ATM account, a wire transfer, etc. It should be understood that the service 15 can allow customers to electronically transfer funds to a new account from an existing account (e.g., a checking account) managed by the financial institution from which the customer is requesting a new account or can allow customers to electronically transfer funds to a new account from an existing account or source managed by another financial institution, such as a debit card or a credit card account. For example, in some embodiments, the online account opening service 15 accepts credit card information and/or debit card information, validates the card information, and enacts a series of electronic transactions to transfer funds from a credit card account or a debit card account to a new account.

As shown in FIG. 2, using the funding source information 30, the online account opening service 15 can perform risk assessment and evaluation services on the funding source specified by the customer, such as determining a risk score for the funding source, performing additional identity authentication services, and/or performing data matching services, such as a magnetic ink character recognition ("MICR") or account number and name data matching services, to verify the customer and/or the funding source. For example, the service 15 can attempt to match a customer's personal data 18 and/or funding source data 30 to financial data (e.g., credit bureau data, debit bureau data, financial account data, historical debit data collected by the financial institution, etc.) accessible and/or owned by the financial institution. For example, a financial institution can attempt to match a customer's name to the customer's funding source by accessing previously-collected debit data. In some embodiments, the online account opening service 15 combines the results of various risk assessment and evaluation services in order to determine a risk score associated with the funding source.

If the online account opening service 15 can match all or a portion of the customer's funding source information 30 with the customer's account application information 18 (or if a risk score associated with the funding source is equal to or above a predetermined threshold or value set by the financial institution) (step 34), the service 15 can proceed with approving the new account application and opening and funding the new account from the specified funding source. In some embodiments, the service 15 can open a new account by transmitting data and/or instructions to a separate application or system (e.g., managed by the financial institution), which "opens" the new account (e.g., stores a new database record in an account database managed by the financial institution).

After the account is "opened" or created, the service 15 can transfer funds to the account. In some embodiments, the service 15 can transfer funds by transmitting instructions to a separate application or system, which performs the transfer. As noted above, the service 15 can allow transfers from various funding sources. Therefore, the service 15 can perform various types of electronic fund transfers, such as a credit card transaction, an ACH transfer, a debit card or ATM transaction, or a wire transfer. The funds transfers can occur over various time periods. For example, the service 15 can perform a substantially real-time debit card or ATM transaction, can perform a next day ACH transfer, and/or can perform a multiple day (e.g., 3 day) wire transfer.

As shown in FIG. 2, if the online account opening service 15 cannot match some or all of the customer's funding source information 30 with the customer's account application information 18 (or if a risk score associated with the funding source is below or unequal to a predetermined threshold or value set by the financial institution), the service 15 can reject and terminate the new account transaction or can accept the new account transaction and place a hold on the new account (step 38). In some embodiments, after placing a hold on a new account, the service 15 directs the customer applying for the new account to fund the new account through a different funding source (e.g., a credit card account or a debit card account) and prompts the customer for new funding source information 30.

Figure 4:
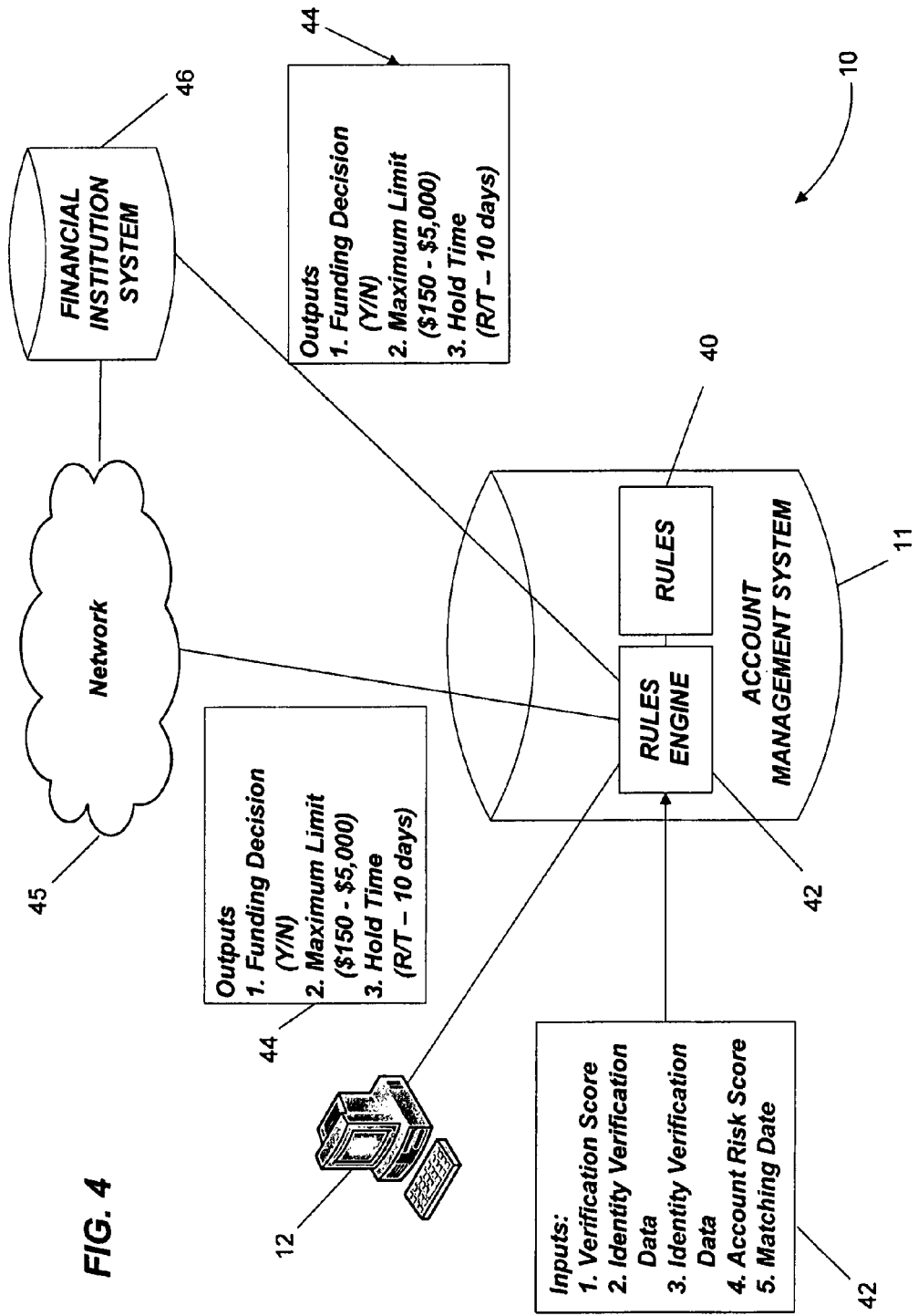
FIG. 4 illustrates a method of verifying a funding source for a new account according to an embodiment of the invention.

In some embodiments, if a new account transaction is accepted and/or if a hold is placed on a new account, the account opening service 15 also determines one or more constraints for the funding of the new account. For example, as shown in FIG. 4, the online account opening service 15 can apply rules 40 (e.g., business rules set by the financial institution associated with the service 15) via a rules engine application 42 to one or more funding inputs 42 (e.g., a verification score, identity verification data, identity authentication data, an account risk score, matching data, etc.) in order to determine one or more funding outputs 44. The funding outputs 44 can include a funding decision (i.e., whether to accept the customer's request to open a new account). If the customer's request for a new account is accepted, the funding outputs 44 can also include one or more funding constraints for a new account (e.g., a maximum funding amount, a funding hold time, etc.). In some embodiments, by developing parameters for funding constraints based upon the decisions or scores determined by customer and funding source authentication and/or risk assessment services, the service 15 provides an account opening solution that minimizes customer intrusion, time, and effort while maximizing risk mitigation. For example, highly qualified prospective customers or customers can have the most flexibility in funding their new account and less qualified prospective customers or customers can have less flexibility in funding their new account. In some embodiments, using the rules 40 and the rules engine application 42 to determine funding constraints on a new account, a financial institution managing the online account opening service 15 can allow more new accounts to be opened online.

In some embodiments, the online account opening service 15 uses decision trees to segment a prospective customer base according to levels of business risk that the funding of a new account poses to the financial institution operating the online account opening service 15. Rules 40 supplied by the financial institution operating the online account opening service 15 (e.g., via the automated configuration application 16) can drive the flow and control of the decision trees. In some embodiments, the application and status of decision trees can be monitored via a management console application, as described below with respect to FIG. 6.

The authentication/verification and risk assessment performed by the online account opening service 15 can provide a substantially instant, same session, independent verification of a funding source that is a less intrusive way of reducing risk of fraudulent funding. For example, the authentication/verification and risk assessment performed by the online account opening service 15 can provide customer verification, customer risk assessment, and account risk assessment, which can include matching the customer with the funding source specified by the customer. Therefore, the authentication/verification and risk assessment performed by the online account opening service 15 can provide a thorough assessment of a customer applying for a new account and a thorough assessment of a funding source specified by the customer, which can reduce fraud and losses experienced by a financial institution due to fraud and high risk customers.

The online account opening service 15 can be integrated with other services and/or systems of a financial institution (e.g., a core system). For example, a financial institution can integrate the online account opening service 15 in real-time with leading core systems. With support for messages such as New Account, New Sub-Account, Inquiry, Transaction, Lookup, Card, Warning, Hold, Password(s), Owner, etc., an integration module of the online account opening service 15 can map message types to proprietary host system formats for a generally seamless interface for automatically routing new account applications to a financial institution. In some embodiments, the online account opening service 15 routes new account applications to a financial institution system in substantially real-time or as a batch (e.g., overnight). The integration module of the service 15 can connect to an environment of a financial institution through an encrypted Internet- or virtual private network- ("VPN-") based connection.

As shown in FIG. 4, using the rules 40 and the rules engine application 42, the account management system 11 can determine whether to allow a customer to open an account and, if the customer is allowed to open an account, can determine one or more funding constraints for the account, such as a funding limit for the account (e.g., $150 to $5,000) and/or a hold time that specifies a time period before funds transferred to the new account are available for use (e.g., real-time to 10 days). As described above, these decisions can be based on the scores determined by the customer/funding source authentication and/or verification services used by the online account opening service 15 and/or a final risk score determined therefrom. The financial institution can set the limits or constraints applied to each score or ranges of scores in order to set the risk experienced by the financial institution accordingly (e.g., via the automated configuration application 16). As shown in FIG. 4, the account management system 11 can transmit the funding outputs 44 to a system 46 of a financial institution directly and/or via one or more computer networks 45. The account management system 11 can also transmit the funding outputs 44 to the remote device 12 that submitted the new account application.

If the online account opening service 15 approves a new account for a customer, the service 15 can provide fulfillment and integration services. For example, the service 15 can provide one or more forms to a customer for signing. As noted above, the service 15 can provide electronic signature tools that a customer can use to digitally sign the account forms. The forms can include standard forms or custom forms defined by the financial institution.

As shown in FIG. 2, after funding constraints have been determined by the online account opening service 15, the service 15 can perform the initial funding (step 36) (e.g., ACH, credit card, debit card, etc.) by communicating with one or more external systems 50 (e.g., a financial institution 50a, a meta bank 50b, a credit card verification system 50c, a credit card processing and settlement system 50d, etc.). In some embodiments, the service 15 provides one or more funding options, such as instant funds transfers, hold placement automation, and conditional funds access. If the funding source of the customer includes a particular type of account (e.g., a credit card account 51), the online account opening service 15 may prompt the customer for additional funding information 52 (e.g., a credit card account number, a name associated with a credit card account, an expiration date, etc.) before performing the new account funding. Performing the funding transaction can include transferring funds from general ledger to a share; from a settlement account (share) to another share; from a customer/member share to another share; from a share in an existing customer/member's existing account to a share in an existing customer/member's new account; from cash, check, money order, payroll check, etc.; or via a core credit union ACH origination.

In some embodiments, when creating a new account, the service 15 can automatically create an account number, name, card, hold, and PIN associated with the new account. In addition, in some embodiments, a customer can use the online account opening service 15 to order checks, order a debit card, set up and/or order ATM card member information, set up and access online or telephone banking services, set up and access online bill payment services, configure overdraft options (e.g., set up savings overdraft protection to prime/membership savings), and/or configure certificate maturity and dividend options. The online account opening service 11 can also automate one or more of the above activities, such as by automatically ordering checks or a debit card for a customer and/or by setting up a default username and password that the customer can use to access online banking services and/or online bill payment services.

With continued reference to FIG. 2, after creating and funding the new account (step 54), the online account opening service 11 can provide account opening information 56 to the customer and/or a financial institution. For example, the service 15 can provide information to the customer and/or a financial institution that specifies an amount of money transferred to the new account, the funding source or type choice, a name associated with the funding source, a RTN number or credit card number of the funding source, etc.

Figure 5:
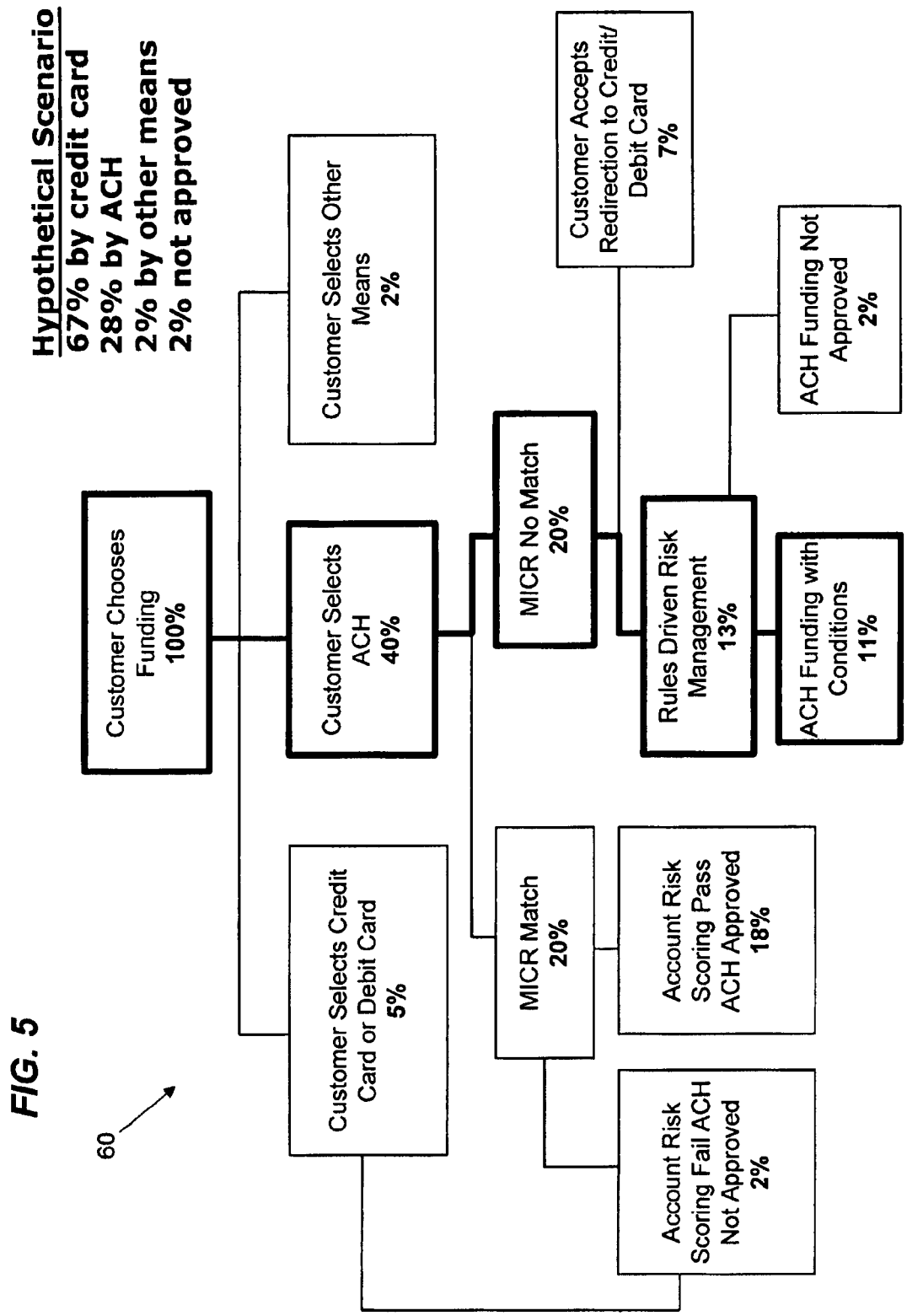
FIG. 5 illustrates a hypothetical scenario for approving new account requests according to an embodiment of the invention.

FIG. 5 illustrates a hypothetical scenario 60 for approving new account requests according to one embodiment of the invention. The scenario 60 illustrated in FIG. 5 illustrates hypothetical percentages of customers opening new accounts using the online account opening service 15 and choosing various funding sources (e.g., credit or debit card accounts, checking account or ACH accounts, and other means). As shown in FIG. 5, using the above authentication, verification, and risk assessment method 14 as described above with respect to FIGS. 2 and 4, the online account opening service 11 can determine whether to accept, reject, or accept with particular constraints a customer's new account application. In the hypothetical situation shown in FIG. 5, using the rules-driven risk management strategy, as described above with respect to FIG. 4, the online account opening service 15 can accept and open approximately 11% more accounts. This increase in accepted new accounts can provide additional revenue for a financial institution without exposing the financial institution to high or undesired financial risk.

Figure 6:
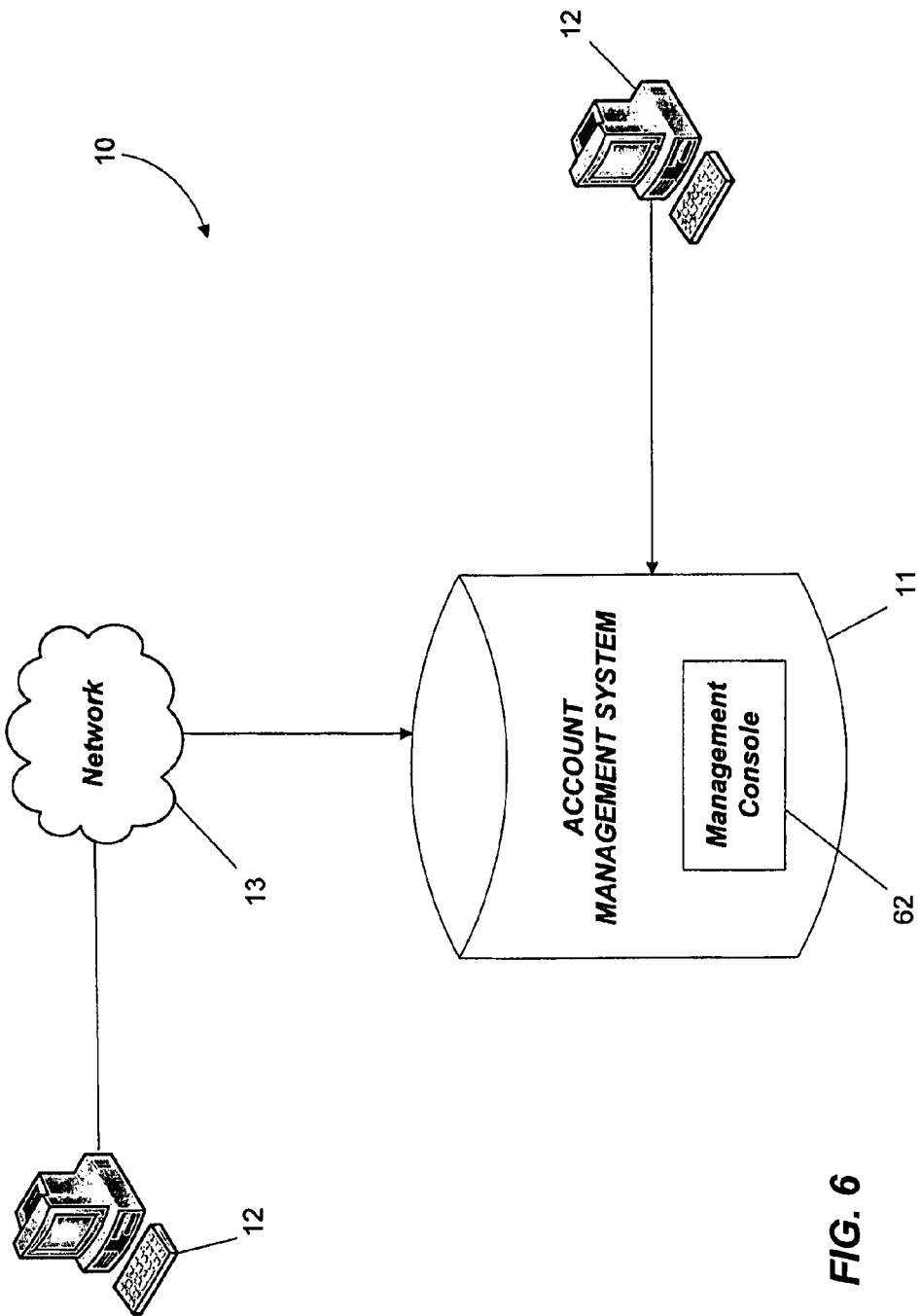
FIG. 6 illustrates a system for monitoring an account opening process according to an embodiment of the invention.

As noted above, the online account opening service 15 can also use similar business rules to provide cross-selling options to customers. For example, additional products can be dynamically offered to a customer through the online account opening service 15 based on the decisions, scores, and recommendations determined by the service 15. A customer can also use interactive screens provided by the service 15 to accept or decline offered products and, in some embodiments, to set-up or manage accepted products In some embodiments, the online account opening service 15 provides a management console that can provide monitoring (e.g., generally seamless reporting and exception management) of the account opening and/or funding process. FIG. 6 illustrates a system for managing the funding process according to an embodiment of the invention. As shown in FIG. 6, the account management system 11 can provide or host (e.g., ASP host) a management console application 62, and agents or employees associated with a financial institution can access the management console 62 to obtain a multipurpose view of automated processes performed by the account management system 11. In some embodiments, an individual associated with a financial institution can access the management console using a remote device 12 connected to the account management system 11 via one or more networks 13. For example, an individual can executes a browser application to request, access, view, and provide input to screens (e.g., web pages) of the management console application 62. Alternatively or in addition, the management console application 62 can be stored locally by a remote device 12 and can request and receive status and reporting information from the account management system 11 via a direct or indirect (e.g., via the Internet) connection. Individuals requesting access to the management console application 62 can be authorized by the application 62 before being allowed access. For example, an individual can provide a username, a password, a personal identification number ("PIN"), and/or other identifying information, and the management console application 62 can process the identifying information in order to authorize the individual.

In some embodiments, the management console application 62 provides access to queues for manual and exception processes and can give an account opening process owner or manager a window into effectiveness and/or efficiency parameters of the account opening process. For example, the management console application 62 can display the number of new account requests accepted by the service 15, the number of new account requests rejected by the service 15, the percentage of new account requests accepted or declined by the service 15, the average or total amount of funds transferred to new accounts, the types and number of constraints associated with new accounts, etc. The parameters can be based on processes occurring with a predetermined time period, such as processes occurring over the past 24 hours, over the past week, over the past month, etc. The management console application 62 can allow an individual to modify the predetermined time period in order to view parameters over various time periods. In some embodiments, the management console application 62 can also display pending new account requests (e.g., new account requests requiring manual review). An individual can use the management console application 62 to route a pending request to a particular individual associated with the financial institution, to accept a pending request, to reject a pending request, to set funding constraints for a pending request, and/or to document information associated with a pending request.

The management console application 62 can be secure and can provide real-time, web-based transaction and activity reporting. Using the management console application 62, process owners, product managers, auditors, and compliance officers can have access to reports and documentation (e.g., standard or customized) that enable access and management of account opening processes, policies, and procedures. The management console application 62 can allow a user to manage open items, automatically assign and route tasks based on user roles, display a pending queue for tasks awaiting a review decision, and provide campaign management. The management console application 62 can also provide audit trails and can provide permissions-based access control. In some embodiments, the management console application 62 includes a modular design that is customizable by a financial institution (e.g., using a rules-driven strategy). In some embodiments, the management console application 62 also allows an individual to configure the system 15. For example, the management console can be combined with the functionality of the automated configuration application 16, as described above with respect to FIG. 3.

The functionality of the online account opening service 15 can be governed by the Fair Credit Report Act ("FCRA") and can provide a notification of an adverse action if the online account opening service 15 declines a customer's request for a new account. In some embodiments, the online account opening service 15 or the financial institution managing the service 15 provides a FCRA call center for directing customers to individuals or agencies for processing the notification. As noted above, the online account opening service 15 can also direct the declined customer to use an alternate funding source (e.g., a credit card or a debit card) in order to overcome a declination.

In some embodiments, in addition to providing account opening services to a financial institution, the online account opening service 15 also provides account funding services, ACH processing services, automated funding risk management strategies services, and/or professional consulting services for establishing a custom funding risk management strategy.

It should be understood that the funding source verification method described above can be used with various other financial products and service other than or in addition to new account opening and funding. For example, the funding source verification method described above can be performed to authenticate automated bill payments, to qualify funding accounts for stored value accounts, and/or to open mortgage accounts. It should also be understood that the funding source verification method described above can be combined with other verification methods, such as challenge deposits, in order to provide additional verification processes.

Various features and advantages of the invention are set forth in the following claims.

The invention claimed is:

1. A method of opening an account with a financial institution via an account management system having an account opening service, the account management system including a memory module, an input/output interface, and a processor, the method comprising:
   electronically storing in the memory module at least one rule for opening an account with a financial institution;
   electronically receiving, by the input/output interface, account application information from a remote device over at least one network, the account application information including personal information of a customer requesting to open an account;
   electronically receiving, by the input/output interface, funding source information from the remote device over at least one network, the funding source information specifying at least one funding source;
   electronically receiving, by the input/output interface, transmitted configuration information; and
   processing the transmitted configuration information so as to modify functionality of the account opening service, wherein the functionality comprises:
      determining with the processor, based on the account application information, at least one risk score specifying a risk to the financial institution of transferring funds from the at least one funding source to the account;
      comparing the at least one rule with the at least one risk score by the processor in order to determine a decision regarding the account application information by comparing the at least one rule with the at least one risk score in order to determine whether to accept the account application information and open the account;
      determining one or more parameters for at least one funding constraint based upon the account application information;
      electronically transmitting, by the input/output interface, the decision and the one or more parameters to the financial institution over the at least one network; and
      providing an account-opening solution in accordance with the decision and the one or more parameters.

2. The method of claim 1, wherein the functionality further comprises comparing the at least one rule with the at least one risk score in order to determine the at least one funding constraint, the at least one funding constraint being a maximum funding amount for the account.

3. The method of claim 1, wherein the functionality further comprises comparing the at least one rule with the at least one risk score in order to determine the at least one funding constraint, the at least one funding constraint being a hold time for funds transferred to the account.

4. The method of claim 1, further comprising electronically receiving the at least one rule from an individual associated with the financial institution over at least one network.

5. The method of claim 1, further comprising opening the account with the financial institution by way of the processor and associating the at least one funding constraint with the account.

6. The method of claim 1, further comprising transferring funds to the account by way of the processor via at least one of a credit card transaction, a debit card transaction, an ACH transaction, and a wire transfer.

7. The method of claim 1, wherein the determining at least one risk score with the processor based on the account application information includes determining a risk score specifying a risk to the financial institution of opening the account for the customer.

8. The method of claim 1, wherein the determining at least one risk score specifying a risk to the financial institution of transferring funds from the at least one funding source includes determining a risk score based on attempting to match at least a portion of the account application information with at least a portion of the funding source information.

9. The method of claim 8, wherein the determining at least one risk score with the processor based on attempting to match at least a portion of the account application information with at least a portion of the funding source information includes processing previously-collected debit data with the processor.

10. An account management system for opening an account with a financial institution via an account opening service, the system comprising:
- an electronically-implemented memory configured to store at least one rule for opening an account with a financial institution and a rules engine application;
- an electronically-implemented input/output interface device configured to receive:
    - account application information from at least one remote device over at least one network and
    - transmitted configuration information; and
- an electronically-implemented processor programmed to:
    - process the transmitted configuration information so as to modify functionality of the account opening service, the functionality configured to:
        - determine at least one risk score based on the account application information, the at least one risk score specifying a risk to the financial institution of opening the account for the customer;
        - execute the rules engine application to compare the at least one rule with the at least one risk score in order to determine a decision regarding the account application information;
        - determine one or more parameters for at least one funding constraint based upon the account application information; and
        - provide an account-opening solution in accordance with the decision and the one or more parameters.

11. The system of claim 10, wherein the at least one funding constraint includes a maximum funding amount for the account.

12. The system of claim 11, wherein the at least one funding constraint includes a funding hold time for funds transferred to the account.

13. The system of claim 11, wherein the input/output interface electronically transmits the decision and the at least one funding constraint to the remote device over at least one network.

14. A system for opening an account with a financial institution, the system comprising:
- an account management system having an account opening service;
- at least one network; and
- at least one remote device configured to electronically transmit account application information and configuration information to the account management system over the at least one network;
- wherein the account management system is configured to:
    - process the transmitted configuration information so as to modify functionality of the account opening service, the functionality configured to:
        - generate at least one risk score based on the account application information;
        - compare at least one rule to the at least one risk score in order to determine a decision regarding the account application information;
        - determine one or more parameters for at least one funding constraint based upon the account application information;
        - electronically transmit the decision and the one or more parameters to the at least one remote device over the at least one network; and
        - provide an account-opening solution in accordance with the decision and the one or more parameters.

* * * * *